US010838528B2

United States Patent
Fujii et al.

(10) Patent No.: US 10,838,528 B2
(45) Date of Patent: Nov. 17, 2020

(54) TOUCH PANEL AND DESIGN STRUCTURE PROVIDED WITH SAME

(71) Applicant: PANASONIC INTELLECTUAL PROPERTY MANAGEMENT CO., LTD., Osaka (JP)

(72) Inventors: Shoji Fujii, Osaka (JP); Keishiro Murata, Kyoto (JP); Hirofumi Komiya, Osaka (JP); Keisyu Muraoka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/492,896

(22) PCT Filed: Feb. 22, 2018

(86) PCT No.: PCT/JP2018/006559
§ 371 (c)(1),
(2) Date: Sep. 10, 2019

(87) PCT Pub. No.: WO2018/168387
PCT Pub. Date: Sep. 20, 2018

(65) Prior Publication Data
US 2020/0057514 A1 Feb. 20, 2020

(30) Foreign Application Priority Data

Mar. 14, 2017 (JP) .................. 2017-048085
May 22, 2017 (JP) .................. 2017-101185

(51) Int. Cl.
*G06F 3/041* (2006.01)
*B60K 37/06* (2006.01)
*G01C 21/36* (2006.01)

(52) U.S. Cl.
CPC .............. *G06F 3/041* (2013.01); *B60K 37/06* (2013.01); *B60K 2370/1434* (2019.05); *G01C 21/3664* (2013.01)

(58) Field of Classification Search
CPC ... G06F 3/041; B60K 2370/152; B60K 37/06; B60K 2370/1434; B60K 2370/816;
(Continued)

(56) References Cited

U.S. PATENT DOCUMENTS 9,454,179 B2 * 9/2016 Shin ................... G06F 1/1637
2012/0280368 A1 11/2012 Garner et al.
(Continued)

FOREIGN PATENT DOCUMENTS

JP 2012-043165 A 3/2012
JP 2013-182549 A 9/2013
(Continued)

OTHER PUBLICATIONS

International Search Report dated May 15, 2018 in International Patent Application No. PCT/JP2018/006559; with English translation.
(Continued)

*Primary Examiner* — Muhammad N Edun
(74) *Attorney, Agent, or Firm* — McDermott Will & Emery LLP

(57) ABSTRACT

A first member of a cover member includes an operation portion disposed so as to correspond to a position where a sensor body is attached and having a sensor region (T) of substantially the same size as a sensor unit on the front side of the operation portion, and a design connection portion that is continuous with a side part of the operation portion and that has a surface formed so as to be continuous with a contoured surface of a wall and curved with a smaller radius of curvature than a surface shape of the operation portion.

13 Claims, 7 Drawing Sheets

(58) Field of Classification Search
CPC .... B60K 37/02; G01C 21/3664; B32B 17/10; B32B 27/28; B32B 27/30
See application file for complete search history.

(56) References Cited

U.S. PATENT DOCUMENTS

| | | |
|---|---|---|
| 2013/0228441 A1 | 9/2013 | Santo et al. |
| 2015/0097389 A1* | 4/2015 | Dryselius ............ G02F 1/13306 296/96.19 |
| 2015/0174861 A1 | 6/2015 | Hasegawa et al. |
| 2015/0378477 A1 | 12/2015 | Yoshiki |
| 2016/0202842 A1 | 7/2016 | Uriu et al. |
| 2016/0266692 A1* | 9/2016 | Park ......................... B32B 3/02 |
| 2016/0334897 A1 | 11/2016 | Nakamura et al. |
| 2016/0352031 A1* | 12/2016 | Ito ............................ H01R 4/04 |
| 2017/0087807 A1 | 3/2017 | Lee et al. |
| 2017/0205927 A1* | 7/2017 | Lee ....................... G06F 1/1637 |

FOREIGN PATENT DOCUMENTS

| | | |
|---|---|---|
| JP | 2015-092422 A | 5/2015 |
| JP | 2015-141581 A | 8/2015 |
| JP | 2015-179327 A | 10/2015 |
| WO | 2013/099726 A1 | 7/2013 |
| WO | 2013/111672 A1 | 8/2013 |
| WO | 2015/029350 A1 | 3/2015 |
| WO | 2016/098181 A1 | 6/2016 |

OTHER PUBLICATIONS

International Search Report dated Mar. 27, 2018 in International Patent Application No. PCT/JP2018/006560; with English translation.
Non-Final Office Action issued in U.S. Appl. No. 16/492,923, dated May 29, 2020.

* cited by examiner

TOUCH PANEL AND DESIGN STRUCTURE PROVIDED WITH SAME

CROSS-REFERENCE OF RELATED APPLICATIONS

This application is the U.S. National Phase under 35 U.S.C. § 371 of International Patent Application No. PCT/JP2018/006559, filed on Feb. 22, 2018, which in turn claims the benefit of Japanese Application No. 2017-101185, filed on May 22, 2017 and Japanese Application No. 2017-048085, filed on Mar. 14, 2017, the entire disclosures of which Applications are incorporated by reference herein.

TECHNICAL FIELD

The present invention relates to touch panels and design structures provided with the same.

BACKGROUND ART

A touch panel described in, e.g., Patent Document 1 is conventionally known as a touch panel that is attached to an interior member (hereinafter referred to as a "design member" of a vehicle when in use.

Patent Document 1 discloses a touch panel including: a base glass having a curved surface, a capacitive touch sensor unit stacked on the surface of the base glass and formed so that its surface conforms to the curved surface; and a cover glass stacked on the surface of the touch sensor and formed so that its surface conforms to the curved surface. The cover glass is formed so that its entire surface is uniformly curved with the same radius of curvature as that of the curved surface of the base glass.

CITATION LIST

Patent Documents

PATENT DOCUMENT 1: Japanese Unexamined Patent Publication No. 2015-92422

SUMMARY OF THE INVENTION

Technical Problem

In the touch panel of Patent Document 1, the entire surface of the cover glass is uniformly curved with a predetermined radius of curvature. Accordingly, in the case where the entire surface of the cover glass is curved with a relatively small radius of curvature so that the touch panel matches the appearance of the design member, the operation surface is also curved with a small radius of curvature. That is, the operation surface is curved sharply. This makes it difficult to perform touch operation and impairs an operation feel of touch operation.

In the case where the entire surface of the cover glass is curved with a relatively large radius of curvature in order to improve an operation feel of touch operation, the surface of the peripheral portion of the cover glass also has a relatively large radius of curvature. That is, the surface of the peripheral portion of the cover glass is curved gently. The peripheral portion of the cover glass is therefore less likely to be continuous with the contoured surface of the design member, and the touch panel is less likely to match the appearance of the design member.

The present invention was developed in view of the above circumstances and it is an object of the present invention to make a touch panel match the appearance of a design member without impairing an operation feel of touch operation.

Solution to the Problem

In order to achieve the above object, a touch panel according to an embodiment of the present invention is attached to a design member having a wall and a housing space formed on a back side of the wall, a part of a surface of the wall being a contoured surface. The touch panel is characterized by including: a cover member disposed in the wall of the design member and including a first member made of a glass plate; and a sensor body attached to a back side of the cover member in the housing space and having a sensor unit capable of detecting touch operation that is performed by an object to be detected which touches a surface of the cover member. The touch panel is characterized in that the first member includes an operation portion disposed so as to correspond to a position where the sensor body is attached and having a sensor region of substantially the same size as the sensor unit on a front side of the operation portion, and a design connection portion that is continuous with a side part of the operation portion and that has a surface formed so as to be continuous with the contoured surface of the wall and curved with a smaller radius of curvature than a surface shape of the operation portion.

Advantages of the Invention

According to the present invention, a touch panel can be made to match the appearance of a design member without impairing an operation feel of touch operation

DESCRIPTION OF EMBODIMENTS

Embodiments of the present invention will be described in detail with reference to the accompanying drawings. The following description of the embodiments is merely illustrative in nature and is not intended to limit the invention, its application or uses.

First Embodiment

Figure 1:
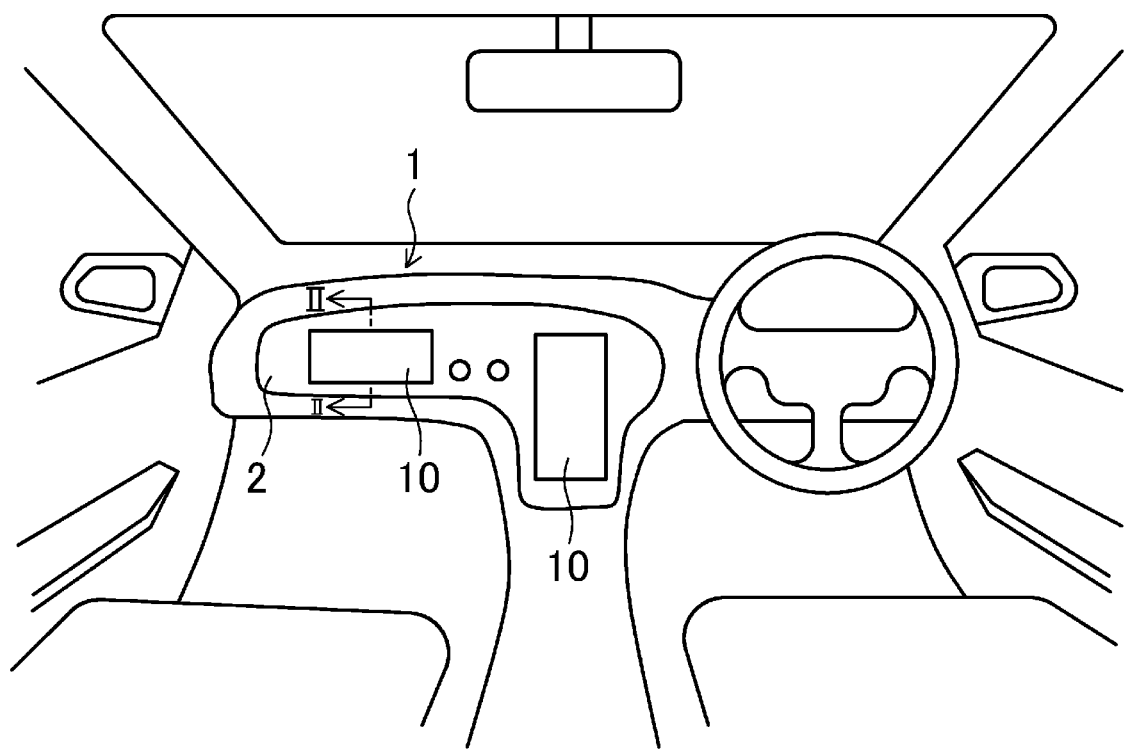
FIG. 1 is an overall perspective view of a touch panel and a design structure provided with the same according to a first embodiment of the present invention.

FIG. 1 shows an overall design structure 1 according to a first embodiment of the present invention. The design structure 1 includes a dashboard (design member 2) installed inside a vehicle and touch panels 10, 10 attached to the design member 2. Each touch panel 10 is a sensor input device that can be operated by touch. In this embodiment, each touch panel 10 is connected to an on-board device such as a car navigation system and is used as an input device for the on-board device. Each touch panel 10 has, but not limited to, a substantially rectangular shape as viewed from the front.

In the following description, regarding the positional relationship of the touch panel 10, the "front side" of the touch panel 10 refers to the side to be touched with a user's finger etc. for touch operation (i.e., the front side of an operation portion 23 described later), and the "back side" of the touch panel 10 refers to the opposite side. This positional relationship has nothing to do with the actual direction of a device including the touch panel 10.

Figure 2:
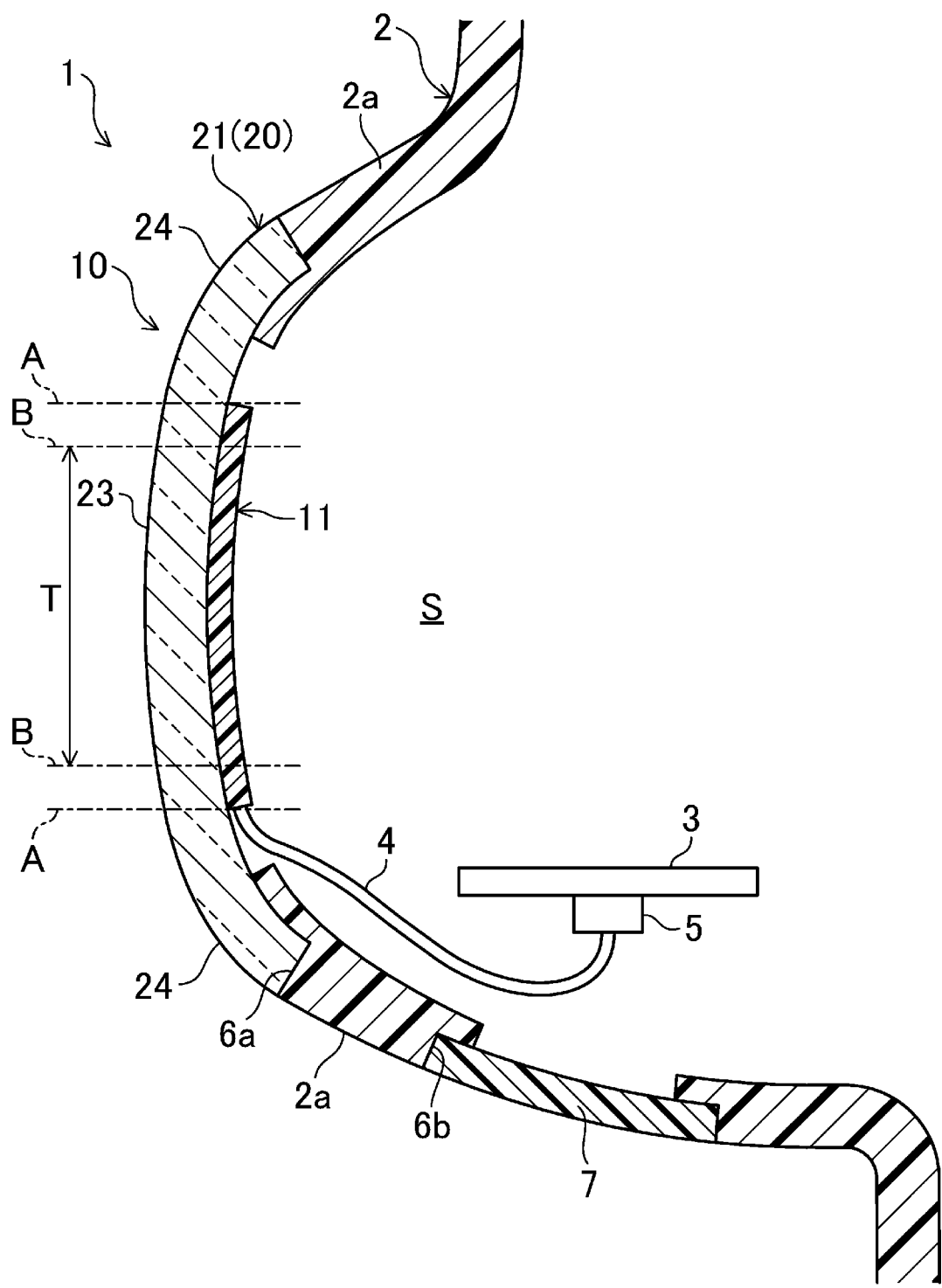
FIG. 2 is a sectional view taken along line II-II in FIG. 1.

As shown in FIG. 2, the design member 2 have a wall 2a, and a part of the surface of the wall 2a is a contoured surface. The contoured surface of the wall 2a is curved with a predetermined radius of curvature. The design member 2 has a housing space S on the back side of the wall 2a. A substrate 3, a flexible circuit board 4, and a connector unit 5 are accommodated in the housing space S.

The substrate 3 is electrically connected to the on-board device (external device) that operates in response to an input operation to the touch panel 10. The flexible circuit board 4 is electrically connected to a sensor body 11 described later. The connector unit 5 is configured to electrically connect the substrate 3 and the touch panel 10 to each other with the substrate 3 and the flexible circuit board 4 being coupled to each other.

The wall 2a of the design member 2 has first and second openings 6a, 6b. The first opening 6a is formed at a position corresponding to the position where a cover member 20 described later is placed. Specifically, the first opening 6a is formed on the front side of the design member 2 and is open in the longitudinal direction. The second opening 6b is formed at a position that is different from the first opening 6a and near the position where the substrate 3 and the connector unit 5 are connected to each other. Specifically, the second opening 6b is formed in the bottom of the design member 2 and is open in the vertical direction. A lid 7 for closing the second the second opening 6b is attached to the wall 2a.

As shown in FIG. 2, the touch panel 10 includes the sensor body 11 and the cover member 20. The cover member 20 is disposed in the wall 2a of the design member 2. Specifically, the cover member 20 is attached to the wall 2a of the design member 2 so as to fit in the first opening 6a. The sensor body 11 is attached to the back side of the cover member 20 so as to be located in the housing space S of the design member 2.

Figure 3:
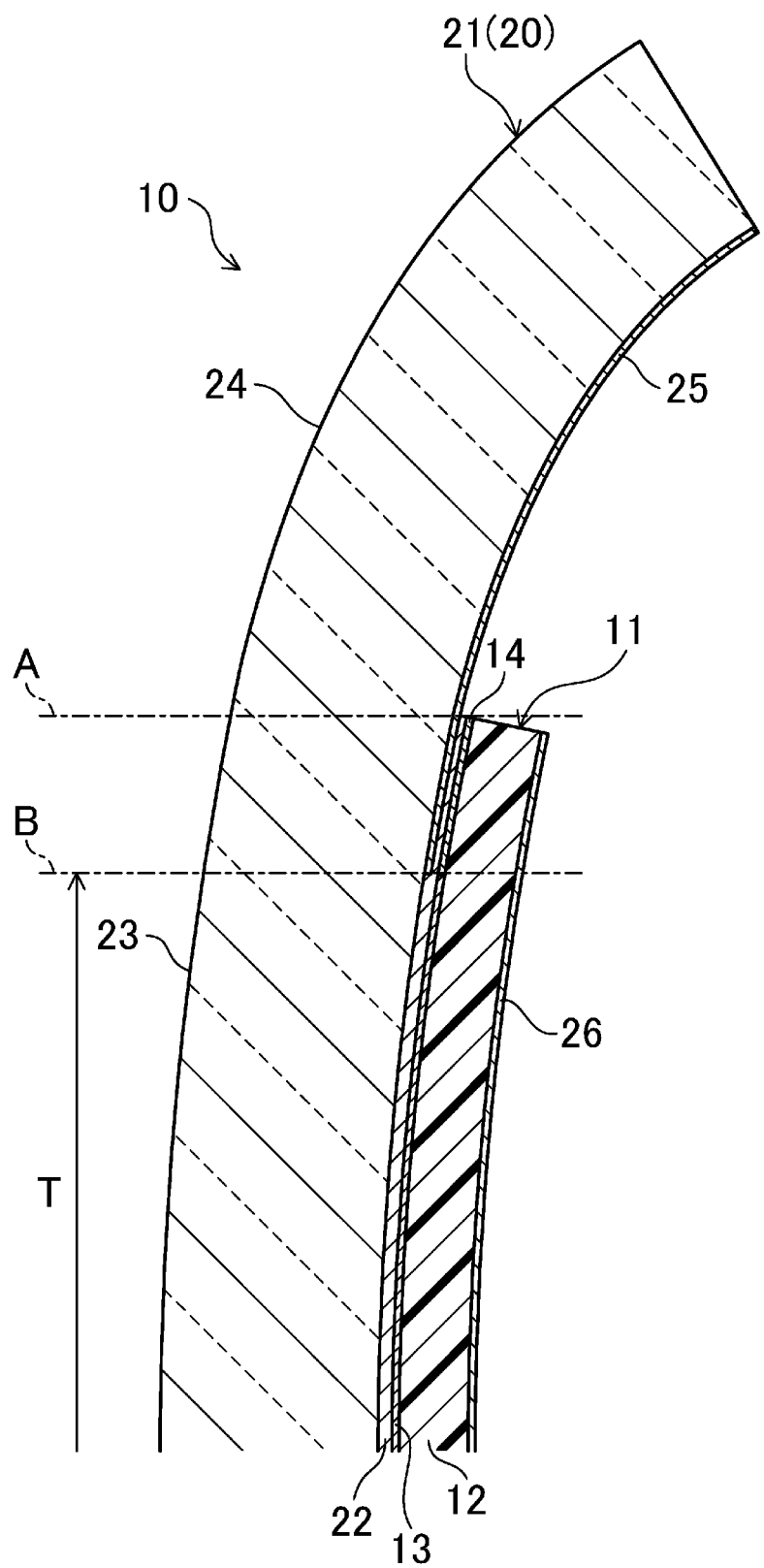
FIG. 3 is a partial enlarged section specifically showing the configuration of the touch panel of FIG. 2.

As shown in FIG. 3, the sensor body 11 has a base 12. The base 12 is, e.g., a light-transmitting resin sheet material such as polyethylene terephthalate, polyether sulfone, or polycarbonate. The base 12 is not limited to the resin sheet material and may be a glass material etc.

A sensor unit 13 is provided on the upper surface of the base 12. The sensor unit 13 can detect touch operation that is performed by an object to be detected which touches the surface of the cover member 20 (the operation portion 23 described later). The sensor unit 13 is made of, e.g., a light-transmitting transparent conductive film such as indium tin oxide or tin oxide and is formed on the upper surface of the base 12 by sputter deposition etc.

A wiring unit 14 electrically connected to the sensor unit 13 is formed on the upper surface of the base 12. The wiring unit 14 is made of silver, carbon, copper foil, etc. and is formed on the side part (i.e., except for the position of the sensor unit 13) of the surface of the base 12 by sputter deposition etc.

As shown in FIG. 3, in this embodiment, the cover member 20 is comprised of a first member 21 only. The first member 21 is made of a light-transmitting glass plate. A transparent color such as, e.g., black, gray, or brown is suitable for the glass plate. The first member 21 is stacked on the front side of the sensor body 11 with a transparent adhesive layer 22 interposed therebetween. Polyvinyl butyral (PVB), an ethylene-vinyl acetate copolymer (EVA), etc. can be used as the adhesive layer 22. The back surface of the first member 21 is curved. In order to form a relatively thin touch panel 10, the first member 21 is formed with a thickness of, e.g., 0.7 mm or more.

As shown in FIGS. 2 and 3, the first member 21 has the operation portion 23 to be operated by touch. The operation portion 23 is disposed at a position corresponding to the position where the sensor body 11 is attached. Specifically, the operation portion 23 is formed such that its side part extends to the positions shown by long dashed short dashed lines A in FIGS. 2 and 3. The operation portion 23 has on its front side a sensor region T having substantially the same size as the sensor unit 13. The sensor region T extend to the positions shown by long dashed short dashed lines B in FIGS. 2 and 3.

The surface of the operation portion 23 is smoothly curved with a larger radius of curvature than the surface of a design connection portion 24 described later. In order to adapt the touch panel 10 to large screens of 25 inches or more, it is preferable that the first member 21 have a thickness of 2.5 mm or less. This makes it easier to form the surface of the operation portion 23 in a smoothly curved shape. Moreover, since deflection is not large, the user's finger does not sink in and the user gets a feel of unity between the operation portion 23 and the design member 2.

As shown in FIGS. 2 and 3, the first member 21 has design connection portions 24, 24 that are continuous with the side part of the operation portion 23. Each design connection portion 24 is formed such that its surface is continuous with the contoured surface on the front side of the wall 2a of the design member 2. The surface of each design connection portion 24 is curved with a smaller radius of curvature than the surface shape of the operation portion 23. More specifically, the surface of each design connection portion 24 is curved in the direction from the front side toward the back side of the cover member 20 such that the side part of the operation portion 23 is located on the front side with respect to the cover member 20. The design structure 1 is configured so that the wall 2a of the design member 2 is continuous with the operation portion 23 of the first member 21 via the smooth curved surfaces of the design connection portions 24, 24.

As shown in FIG. 3, a decorative layer 25 is provided on the back side of the first member 21 (the cover member 20). The decorative layer 25 is formed at a position corresponding to at least each design connection portion 24 and is formed substantially in a frame shape by printing etc. on the outer periphery of the back surface of the cover member 20. The decorative layer 25 on the back side of the cover member 20 is extended from each design connection portion 24 to such a position that the decorative layer 25 covers the wiring unit 14. The decorative layer 25 has the same tone of color as the operation portion 23 (the first member 21), but the decorative layer 25 is a colored opaque layer.

As shown in FIG. 3, a linear polarizer 26 is disposed on the back side of the sensor body 11. A flexible polarizer formed by impregnating polyvinyl alcohol with a dichroic dye such as iodine or dye, stretching the resultant polyvinyl alcohol, and coating the front and back surfaces of the stretched polyvinyl alcohol with a cellulose protective film such as triacetyl cellulose.

(Functions and Effects of First Embodiment)

As described above, in the touch panel 10, the design connection portions 24, 24 are continuous with the side part of the operation portion 23. That is, the design connection portions 24, 24 are interposed between the design member 2 and the operation portion 23 such that the side part of the operation portion 23 is continuous with the wall 2a of the design member 2. Each design connection portion 24 is formed such that its surface is continuous with the contoured surface of the wall 2a. Accordingly, with the touch panel 10 being attached to the design member 2, the cover member 20 does not stick out from the design member 2, which improves a feel of unity between the design member 2 and the touch panel 10 in terms of appearance. The surface of each design connection portion 24 is a curved surface with a smaller radius of curvature than the surface shape of the operation portion 23. Accordingly, with the touch panel 10 being attached to the design member 2, the boundary between the operation portion 23 and each design connection portion 24 can be less visually recognized, and the surface of the operation portion 23 is therefore relatively more gently curved as compared to the design connection portions 24. This makes it easier for the user to operate the operation portion 23 by touch. Accordingly, in the first embodiment of the present invention, the touch panel 10 can be made to match the appearance of the design member 2 without impairing an operation feel of touch operation.

The surface of the operation portion 23 is smoothly curved with a larger radius of curvature than the surface of each design connection portion 24. Accordingly, the touch panel 10 can be made to match the appearance of the design member 2 by the design connection portions 24, 24, and the operation portion 23 with a smoothly curved surface can be satisfactorily operated by touch.

The decorative layer 25 is formed at a position corresponding to at least the design connection portions 24, 24 on the back side of the cover member 20. The decorative layer 25 can prevent the design member 2 located at the position corresponding to each design connection portion 24 from being seen through from the front side of the cover member 20.

The decorative layer 25 on the back side of the cover member 20 is extended from each design connection portion 24 to such a position that the decorative layer 25 covers the wiring unit 14. This can prevent the wiring unit 14 located on the back side of the cover member 20 from being seen through from the front side of the cover member 20.

The operation portion 23 is colored and transparent at least in the sensor region T. This can prevent the sensor unit 13 located on the back side of the cover member 20 from being seen through from the front side of the operation portion 23 in the sensor region T.

The linear polarizer 26 is provided on the back side of the sensor body 11. External light entering the touch panel 10 is therefore blocked by the linear polarizer 26, and light reflection within the touch panel 10 is restrained. As a result, satisfactory display as the touch panel 10 is thus achieved.

In the design structure 1, the wall 2a of the design member 2 has the first and second openings 6a, 6b. The touch panel 10 can therefore be easily accommodated in the housing space S of the design member 2 through the first opening 6a, and with the touch panel 10 being accommodated in the housing space S, the connector unit 5 placed in the housing space S can be attached and detached through the second opening 6b.

In the design structure 1, the lid 7 is fitted in the second opening 6b. Accordingly, the connector unit 5 can be easily attached and detached through the second opening 6b by removing the lid 7.

Second Embodiment

Figure 4:
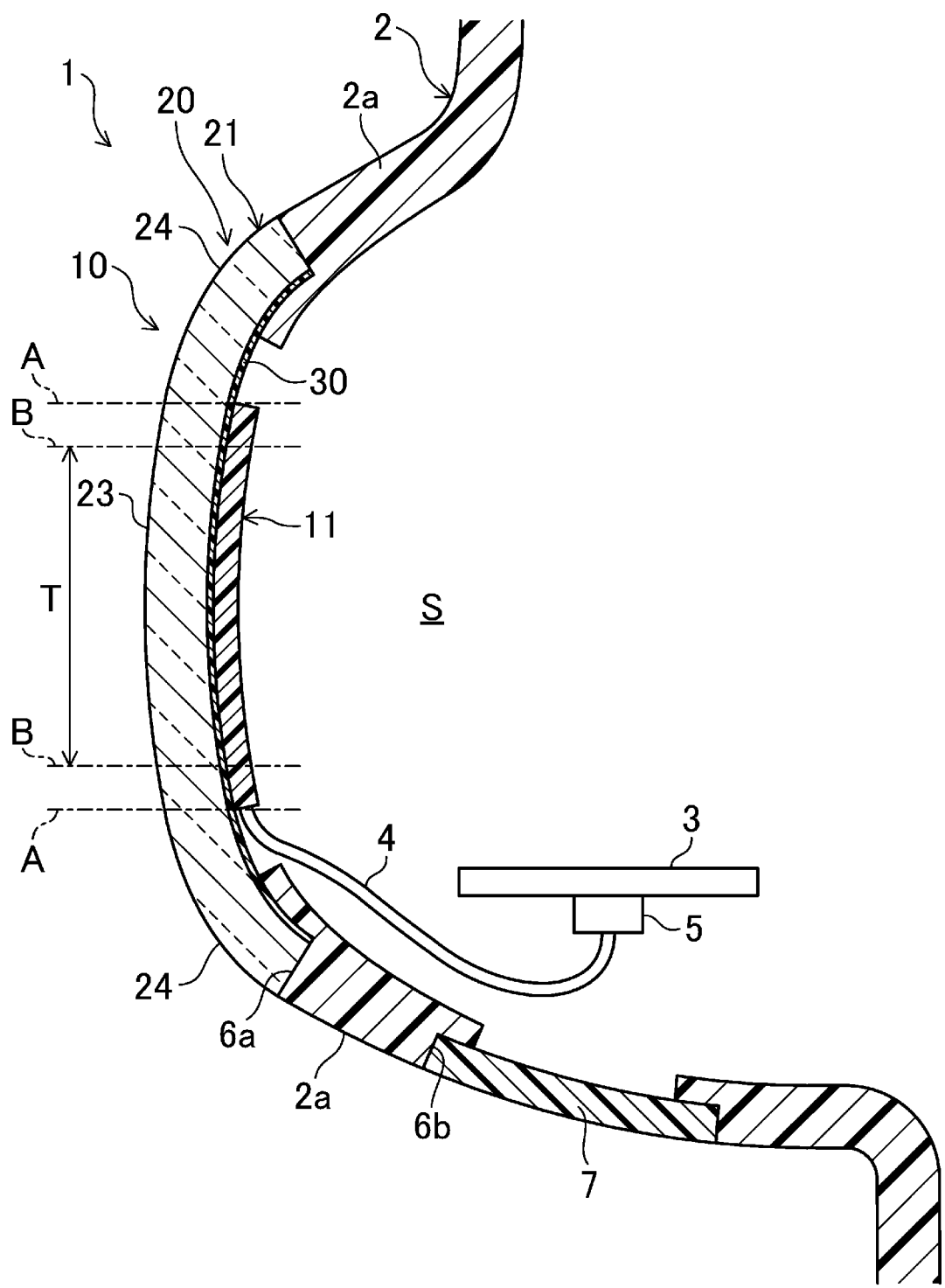
FIG. 4 is a view corresponding to FIG. 2, showing the configuration of a touch panel according to a second embodiment of the present invention.

FIG. 4 shows a touch panel 10 according to a second embodiment of the present invention. In this embodiment, the configuration of the cover member 20 is different from that of the first embodiment. The configuration of the touch panel 10 according to this embodiment is otherwise similar to that of the touch panel 10 according to the first embodiment. Accordingly, in the following description, the same portions as those in FIGS. 1 to 3 are denoted with the same reference characters, and detailed description thereof will be omitted.

As shown in FIG. 4, the cover member 20 includes a resin film 30. The resin film 30 is stacked on the back surface of the first member 21 and has substantially the same size as the first member 21. It is desirable that the resin film 30 be in direct close contact with the first member 21. The resin film 30 may be stacked on the first member 21 with an adhesive.

The resin film 30 is made of a transparent resin material, and is specifically, made of polyvinyl butyral (PVB) or an ethylene-vinyl acetate copolymer (EVA). The resin film 30 is formed with a uniform thickness. The resin film 30 has a curved surface that conforms to the shape of the back surface of the first member 21. The adhesive layer 22 and the decorative layer 25 shown in the first embodiment are disposed on the back surface of the resin film 30.

When the resin film 30 has a thickness of, e.g., 0.1 mm or more, scattering of broken glass pieces will hardly occur in case the first member 21 breaks, as described later. When the resin film 30 has a thickness of 0.3 mm or more, it is easy to form the resin film 30. The upper limit of the thickness of the resin film 30 is not particularly limited. However, for example, in order to form a thin cover member 20, the thickness of the resin film 30 is basically, e.g., about 0.8 mm or less. In the case where a thick first member 21 is used in large screen applications etc., the thickness of the resin film 30 is basically about 1.5 mm or less.

As a touch sensor of related art, Japanese Unexamined Patent Publication No. 2013-182549, for example, discloses a touch sensor in which a capacitive touch sensor body is bonded to a glass cover member. However, this touch sensor of related art does not have a member for protecting the cover member. Accordingly, broken glass pieces scatter in case the cover member breaks. As a solution to this problem, in the touch panel 10 according to the second embodiment, the first member 21 is protected by the resin film 30 placed in close contact with the back surface of the first member 21.

Therefore, even if the first member 21 made of a glass plate breaks by impact, broken pieces of the glass plate will not scatter. That is, the touch panel 10 according to the second embodiment can solve the problem of the touch sensor of related art.

Third Embodiment

Figure 5:
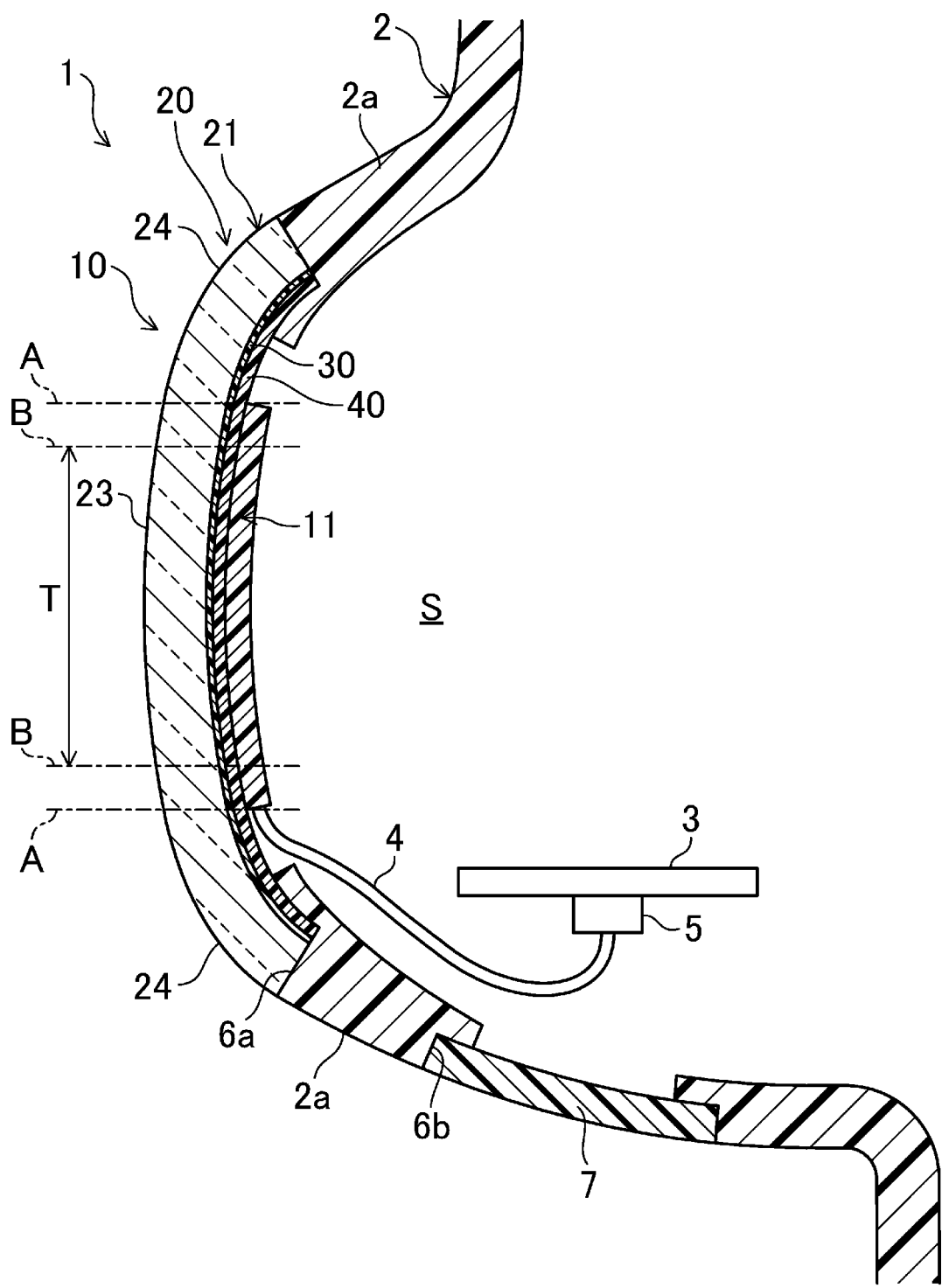
FIG. 5 is a view corresponding to FIG. 2, showing the configuration of a touch panel according to a third embodiment of the present invention.

FIG. 5 shows a touch panel 10 according to a third embodiment of the present invention. In this embodiment, the configuration of the cover member 20 is different from that of the second embodiment. The configuration of the touch panel 10 according to this embodiment is otherwise similar to that of the touch panel 10 according to the second embodiment. Accordingly, in the following description, the same portions as those in FIGS. 1 to 4 are denoted with the same reference characters, and detailed description thereof will be omitted.

As shown in FIG. 5, the cover member 20 includes a second member 40. The second member 40 is disposed so as to conform to the shape of the back surface of the first member 21 with the resin film 30 interposed therebetween. Specifically, the second member 40 is flexible and is stacked on the back side of the resin film 30 with the upper surface of the second member 40 being in close contact with the resin film 30 with a transparent adhesive (not shown) therebetween. The surface of the second member 40 is curved so as to conform to the shape of the back surfaces of the first member 21 and the resin film 30. The adhesive layer 22 and the decorative layer 25 shown in the first embodiment are disposed on the back surface of the second member 40. The second member 40 may be disposed on the resin film 30 with no adhesive therebetween.

For example, the second member 40 is a resin film having a predetermined elastic modulus. A resin film having an elastic modulus similar to that of common glass plates, namely 60 GPa to 150 GPa, is suitable, and especially a resin film having an elastic modulus of less than 80 GPa is preferable.

It is desirable that the resin film be made of an optically isotropic material. For example, the resin film is made of any one of the following resin materials: a cycloolefin polymer (COP), a cyclic olefin copolymer (COC), a polycarbonate (PC), and triacetyl cellulose (TAC). An optically isotropic resin film can be formed by using such a resin material. Alternatively, an optically anisotropic biaxially oriented polyethylene terephthalate (PET) film etc. may be used as the resin film. The resin film can have an elastic modulus of less than 80 GPa when the thickness of the resin film is 0.03 mm or more and 1.85 mm or less.

As described above, in the touch panel 10 according to the present embodiment, the first member 21 is securely protected on its back side by the resin film 30 and the second member 40. Accordingly, even if the first member 21 made of a glass plate breaks by impact, scattering of broken glass pieces of the glass plate is further restrained.

It is preferable that the second member 40 be formed with a smaller thickness than the first member 21. This restrains an increase in overall thickness of the cover member 20. In the third embodiment, the sensor unit 13 and the wiring unit 14 may be formed on the base 12 as in the first and second embodiments or may be formed on the second member 40.

Other Embodiments

The above embodiments are described with respect to the form in which the touch panel 10 is used as an input device connected to an on-board device (external device) such as a car navigation system. However, the present invention is not limited to this form. The touch panel 10 may also be used as an input device for external devices such as a display device for personal computers, a mobile phone, a portable information terminal, a portable game machine, a copying machine, a ticket machine, and an automated teller machine.

Figure 6:
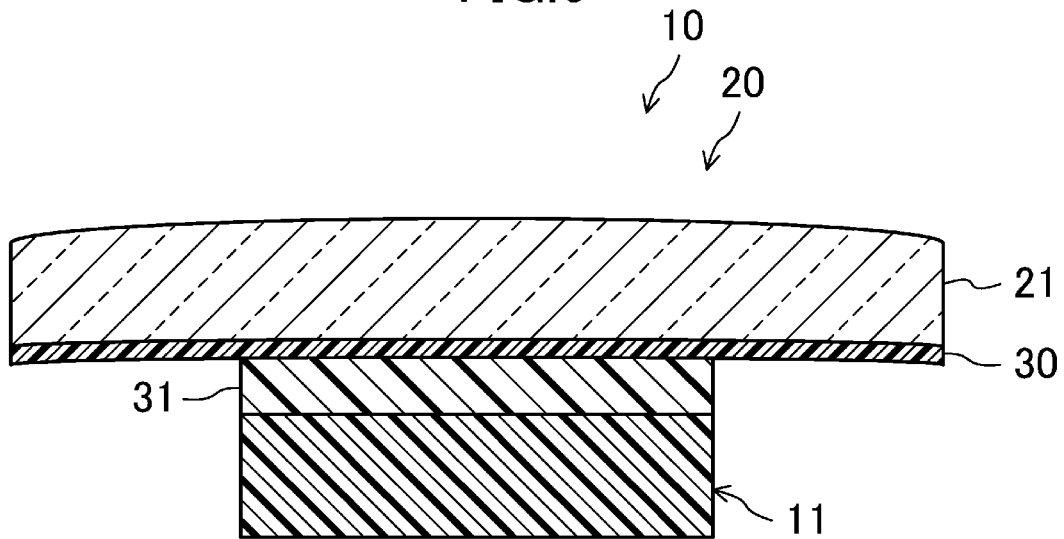
FIG. 6 is a sectional view schematically showing a sectional configuration of a touch panel according to a further embodiment.

In the second embodiment, as shown in FIG. 6, a transparent adhesive 31 may be provided between the back surface of the resin film 30 and the sensor body 11. With this adhesive 31, the sensor body 11 can be easily bonded to the back side of the resin film 30. For example, polyvinyl butyral (PVB) or an ethylene-vinyl acetate copolymer (EVA) is suitable as a material for the adhesive 31.

Figure 7:
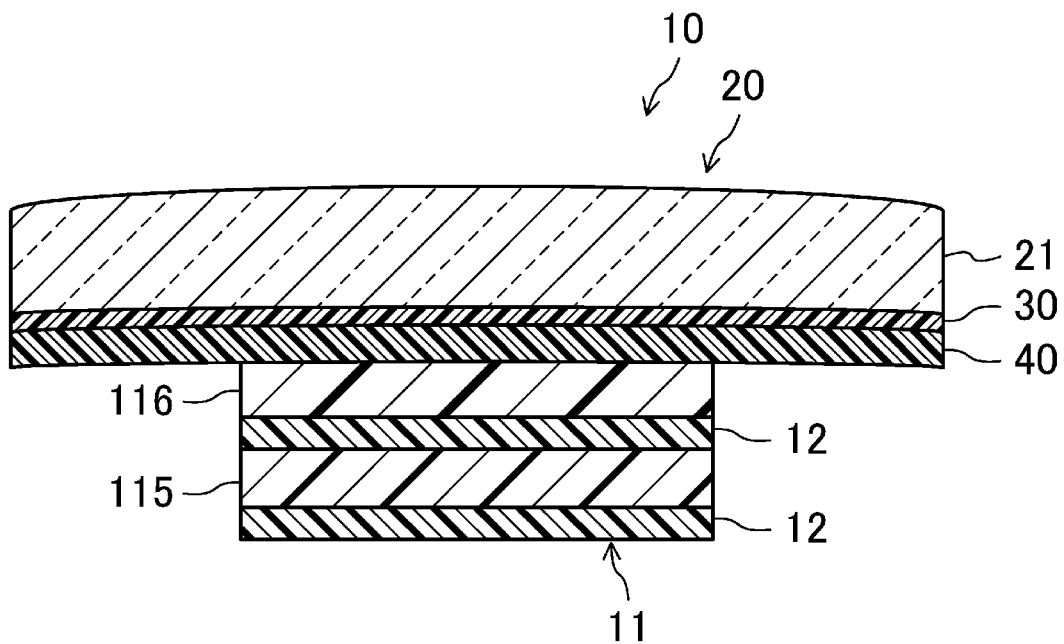
FIG. 7 is a sectional view schematically showing a sectional configuration of a touch panel according to a still further embodiment.

The above embodiments are described with respect to the form in which the sensor body 11 has only one base 12. However, the present invention is not limited to this form. For example, as shown in FIG. 7, the touch panel 10 may be configured so that the sensor body 11 has two or more bases 12, 12, . . . . In the case where the sensor body 11 has two or more bases 12, 12, . . . , the bases 12, 12 are bonded with a transparent adhesive 115. In the touch panel 10 shown in FIG. 7, an adhesive 116 is provided between the base 12 on the front side and the back surface of the second member 40 (the cover member 20), and the base 12 and the second member 40 (the cover member 20) are bonded with the adhesive 116. For example, polyvinyl butyral (PVB) or an ethylene-vinyl acetate copolymer (EVA) is suitable as a material for the adhesives 115, 116.

The above embodiments are described with respect to the form in which the sensor unit 13 is made of a light-transmitting transparent conductive film such as indium tin oxide or tin oxide. However, the present invention is not limited to this form. For example, the sensor unit 13 may be comprised of an electrode formed by arranging opaque conductive thin metal wires in a mesh pattern etc. The wiring unit 14 may be formed by arranging opaque conductive thin metal wires in a mesh pattern, a ladder pattern, etc. The thin wires may be made of a conductive resin.

The above embodiments are described with respect to the form in which a colored transparent glass plate such as black, gray, or brown is used as the first member 21. However, the present invention is not limited to this form. For example, the first member 21 may be a half mirror glass plate. The decorative layer 25 may have a mirror tint. When the first member 21 and the decorative layer 25 have a mirror tint, reflection of external light entering the touch panel 10 is restrained, and the sensor unit 13 and the wiring unit 14 can be made less visible from the front side of the cover member 20.

Figure 8:
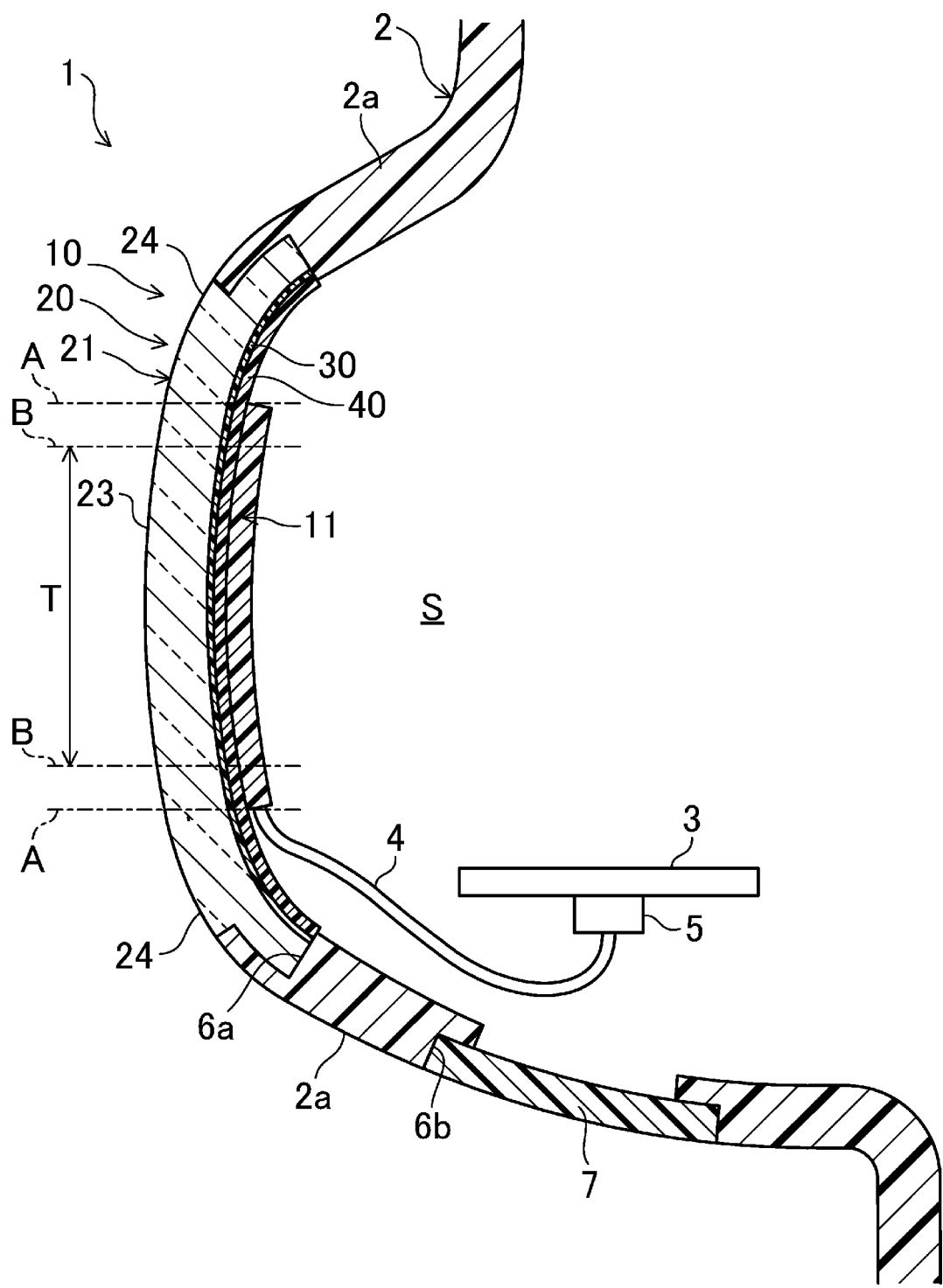
FIG. 8 is a view corresponding to FIG. 5, schematically showing a sectional structure of a touch panel according to a yet further embodiment.

The above embodiments are described with respect to the form in which the tip end of the cutout portion of the wall 2a of the design member 2 is disposed on the back side of the cover member 20 at the position of the first opening 6a (see FIGS. 2, 4, and 5). However, the present invention is not limited to this form. This tip end of the wall 2a may be disposed on the front side of the cover member 20. In this form, it is preferable that the surface of the first member 21 be flush with the surface of the tip end of the wall 2a. For example, as shown in FIG. 8, the first member 21 and the wall 2a may be disposed such that the end of the first member 21 faces the tip end of the wall 2a and the surface of the first member 21 is flush with the surface of the tip end of the wall 2a.

The above embodiments are described with respect to the form in which the operation portion 23 has a smoothly curved surface. However, the present invention is not limited to this form. For example, the surface of the operation portion 23 may be substantially flat at least in the sensor region T. Even when the surface of the operation portion 23 is substantially flat, the touch panel 10 can be made to match the appearance of the design member 2 by the design connection portions 24, 24, and the operation portion 23 can be satisfactorily operated by touch.

The third embodiment is described with respect to the form in which the second member 40 is a resin film. However, the present invention is not limited to this form. For example, the second member 40 may be a thin plate-like resin member or a flexible thin glass plate. Especially in terms of weight reduction etc., it is preferable to use a glass plate with a thickness of 0.01 mm or more and 0.55 mm or less as the second member 40. In order to form a cover member 20 of 25-inch or larger size, it is preferable to use a glass plate with a thickness of 0.01 mm or more and 1.85 mm or less as the second member 40. In the case where a glass plate with a predetermined thickness is used as the second member 40 as described above, the second member 40 can be easily disposed so as to conform to the curved shape of the outer surface of the resin film 30, and air bubbles etc. can be restrained from being trapped between the resin film 30 and the second member 40.

Although the embodiments of the present invention are described above, the present invention is not limited to the above embodiments, and various modifications can be made without departing from the spirit and scope of the invention.

INDUSTRIAL APPLICABILITY

The present invention is industrially applicable as, e.g., a touch panel that is attached to a dashboard installed inside a vehicle and is connected to an on-board device such as a car navigation system, and a design structure provided with the same.

DESCRIPTION OF REFERENCE CHARACTERS

1: Design Structure
2: Design Member
2a: Wall
3: Substrate
4: Flexible Circuit Board
5: Connector Unit
6a: First Opening
6b: Second Opening
7: Lid
10: Touch Panel
11: Sensor Body
12: Base
13: Sensor Unit
14: Wiring Unit
20: Cover Member
21: First Member
23: Operation Portion
24: Design Connection Portion
25: Decorative Layer
26: Linear Polarizer
30: Resin Film
40: Second Member
S: Housing Space
T: Sensor Region

The invention claimed is:

1. A touch panel that is attached to a design member having a wall and a housing space formed on a back side of the wall, a part of a surface of the wall being a contoured surface, comprising:
a cover member disposed in the wall of the design member and including a first member made of a glass plate; and
a sensor body attached to a back side of the cover member in the housing space and having a sensor unit capable of detecting touch operation that is performed by an object to be detected which touches a surface of the cover member, wherein
the first member includes:
an operation portion disposed so as to correspond to a position where the sensor body is attached and having a sensor region of substantially the same size as the sensor unit on a front side of the operation portion, and
a design connection portion that is continuous with a side part of the operation portion and that has a surface formed so as to be continuous with the contoured surface of the wall and curved with a smaller radius of curvature than a surface shape of the operation portion, and
wherein
the cover member includes a resin film made of polyvinyl butyral or an ethylene-vinyl acetate copolymer, and
the resin film is disposed in close contact with a back surface of the first member.

2. The touch panel of claim 1, wherein a surface of the operation portion is smoothly curved with a larger radius of curvature than the surface of the design connection portion.

3. The touch panel of claim 1, wherein a surface of the operation portion is substantially flat.

4. The touch panel of claim 1, wherein a decorative layer is formed on the back side of the cover member at a position corresponding to at least the design connection portion.

5. The touch panel of claim 4, wherein
the sensor body has a wiring unit formed on a front side of the sensor body except for a position of the sensor unit and electrically connected to the sensor unit, and
the decorative layer on the back side of the cover member is extended from the design connection portion to such a position that the decorative layer covers the wiring unit.

6. The touch panel of claim 1, wherein the operation portion is colored and transparent at least in the sensor region.

7. The touch panel of claim 6, wherein a linear polarizer is provided on a back side of the sensor body.

8. The touch panel of claim 1, wherein
the cover member includes a second member disposed on a back surface of the resin film, and
the second member has such flexibility that the second member has a larger elastic modulus than the first member, and the second member conforms to a shape of the back surface of the first member with the resin film interposed therebetween.

9. The touch panel of claim 8, wherein the second member is formed with a smaller thickness than the first member.

10. The touch panel of claim 9, wherein the second member has an elastic modulus of less than 80 GPa and is made of a resin material.

11. The touch panel of claim 10, wherein the second member is made of any one of the following resin materials: a cycloolefin polymer (COP), a cyclic olefin copolymer (COC), a polycarbonate (PC), and triacetyl cellulose (TAC) and has a thickness of 0.03 mm or more and 1.85 mm or less.

12. A design structure including the touch panel and the design member of claim 1, wherein
 a substrate electrically connected to an external device that operates in response to an input operation to the touch panel and a connector unit that electrically connects the substrate and the touch panel are provided in the housing space,
 the wall has first and second openings, and
 the first opening is formed at a position where the cover member is placed, and the second opening is formed at a position that is different from the position of the first opening and near a position where the substrate and the connector unit are connected to each other.

13. The design structure of claim 12, wherein a lid that closes the second opening is disposed in the wall.

* * * * *